(12) United States Patent
Luo

(10) Patent No.: US 9,250,109 B2
(45) Date of Patent: Feb. 2, 2016

(54) VIBRATION ISOLATION SYSTEM OF MASS FLOWMETER

(71) Applicant: Sichuang Zhongce Flow Measurement Technology Co., Ltd., Chengdu (CN)

(72) Inventor: Fan Luo, Chengdu (CN)

(73) Assignee: Sichuang Zhongce Flow Measurement Technology Co., Ltd., Chengdu (CN)

( * ) Notice: Subject to any disclaimer, the term of this patent is extended or adjusted under 35 U.S.C. 154(b) by 71 days.

(21) Appl. No.: 14/277,251

(22) Filed: May 14, 2014

(65) Prior Publication Data

US 2015/0143922 A1     May 28, 2015

(30) Foreign Application Priority Data

Nov. 28, 2013   (CN) .......................... 2013 1 0629229

(51) Int. Cl.
 *G01F 1/84*       (2006.01)
(52) U.S. Cl.
 CPC ................................. *G01F 1/8418* (2013.01)
(58) Field of Classification Search
 CPC ......................................................... G01F 1/84
 USPC ...................................... 73/861.355–861.357
 See application file for complete search history.

(56) References Cited

U.S. PATENT DOCUMENTS

| | | | | |
|---|---|---|---|---|
| 4,491,025 A * | 1/1985 | Smith | ................... | G01F 1/8477 73/861.355 |
| 5,497,666 A * | 3/1996 | Patten | ................... | G01F 1/8413 73/861.355 |
| 6,286,373 B1 * | 9/2001 | Lister | ................... | G01F 1/8409 439/709 |
| 6,308,580 B1 * | 10/2001 | Crisfield | ............... | G01F 1/8409 73/861.355 |
| 2007/0234824 A1 * | 10/2007 | Bitto | ..................... | G01F 1/8409 73/861.355 |
| 2011/0000316 A1 * | 1/2011 | Shimizu | ................ | G01F 1/8409 73/861.357 |
| 2013/0319134 A1 * | 12/2013 | Chatzikonstantinou | | G01F 1/8477 73/861.355 |

* cited by examiner

*Primary Examiner* — Jewel V Thompson
(74) *Attorney, Agent, or Firm* — Hamre, Schumann, Mueller & Larson, P.C.

(57) ABSTRACT

A vibration isolation system of mass flowmeter, includes upper horizontal section, vertical section, lower horizontal section, upper arc section between the upper horizontal section and vertical section, and lower arc section between the vertical section and lower horizontal section of U-shaped measuring tube. On the lower arc section there is vibration isolation block. It is characterized by full-length welding between the vibration isolation block's plane of the axis of U-shaped measuring tube and the lower arc section. The U-shaped measuring tube has an inertia center. The straight-line distance between the external welding point in the full weld of the lower arc section between the vibration isolation block mentioned and the measuring tube and the inertia center is equal to the straight-line distance between the internal welding point and the inertia center.

5 Claims, 4 Drawing Sheets

VIBRATION ISOLATION SYSTEM OF MASS FLOWMETER

TECHNICAL FIELD

The invention relates to a mass flowmeter, which involves a vibration isolation system of mass flowmeter.

BACKGROUND

Exhaust emission of automotives using oil fuel is the main source of air pollution in cities. Promoting the replacement of gasoline and diesel with natural gas as the new fuel of automotives is the important way to effectively reduce the exhaust pollution of automotives. With the country's emphasis on clean energy and the enhancement of people's environmental protection consciousness, as the best alternative source the natural gas is gradually entering into every aspect of our daily life. It is most widely used in automotive industry. Mass flowmeter is one of the most important technological means of trade settlement in CNG industry. Study on high pressure gas flowmeter technology is the inevitable trend of our country to develop automotives with clean and environment-friendly natural gas.

An important standard deciding the quality of flowmeter performance is whether the design of vibration isolation system is reasonable. The main function of the vibration isolation system is to separate the vibration frequency of the measuring tube, and avoid the impact of external vibration on vibration of measuring tube. At present, the mass flowmeter on the market usually adopts the single vibration isolation system, which is a single vibration isolation block (as shown in FIG. 1). Some mass flowmeters use double vibration isolation system (as shown in FIG. 2). It means that two pieces of vibration isolation blocks with the same mass, size and shape are used to form the vibration isolation system.

Through the theoretical research and experiment, it is found that the two kinds of vibration isolation systems have different stress distribution. The stress area of the first vibration isolation form is mainly concentrated on the axis with the same direction of the vibration of measuring tube. The stress form is mainly normal stress (as shown in FIG. 3). The stress area of the second vibration isolation form is mainly concentrated on the axis perpendicular to the vibration of measuring tube. The stress form is mainly shear stress. It has asymmetric distribution (as shown in FIG. 4).

In fact, the stress area on these vibration isolation systems is the welding part of the measuring tube and vibration isolation block. Its strength is determined by the welding material and process. Therefore, whether it is normal stress or shear stress, as long as stress concentration is formed in the welding area, the defects in welding material and process will influence the vibration of the measuring tube.

SUMMARY

The technical problem to be solved by this invention is to provide a kind of vibration isolation system of mass flowmeter which can homogenize the stress of vibration isolation block.

The purpose of the invention is to realize the followings with the following technical proposal:

Vibration isolation system of mass flowmeter, including upper horizontal section, vertical section, lower horizontal section, upper arc section between the upper horizontal section and vertical section, and lower arc section between the vertical section and lower horizontal section of U-shaped measuring tube. On the lower arc section there is vibration isolation block. It is characterized by full-length welding between the vibration isolation block's plane of the axis of U-shaped measuring tube and the lower arc section. The U-shaped measuring tube has an inertia center. The straight-line distance between the external welding point in the full weld of the lower arc section between the vibration isolation block mentioned and the measuring tube and the inertia center is equal to the straight-line distance between the internal welding point and the inertia center.

Further, the acute angle between the vibration isolation block mentioned and the horizontal plane is $\alpha$. The calculating process of $\alpha$ is as follows:

The total inertia moment of U-shaped measuring tube to the vibration isolation block 6 is:

$$J = J1 + J2 + J3 + J4;$$

In which, J1 is the inertia moment of the upper horizontal section 1 with the top length of L to Axis OO'. J2 is the inertia moment of the upper arc section 4 with the upper radius of R to Axis OO'; J3 is the inertia moment of vertical section 2 with the height of H to Axis OO'; J4 is the inertia moment of the arc section with the angle of $\alpha$ in the lower arc section 5 with the radius of R to Axis OO'.

Then $$J_1 = \int_0^L \rho \times A \times \Delta L \times (R + H + R \times \sin\alpha)^2;$$

$$J_2 = \int_0^{\frac{\pi}{2}} 2 \times \rho \times A \times R \times \Delta\theta \times (H + R \times \sin\alpha + R \times \sin\theta)^2;$$

$$J_3 = \int_0^H 2 \times \rho \times A \times \Delta h \times (h + R \times \sin\alpha)^2;$$

$$J_4 = \int_0^\alpha 2 \times \rho \times A \times R \times \Delta\psi \times (R \times \sin\alpha - R \times \sin\psi)^2;$$

A is the cross-sectional area of the measuring tube. $\rho$ is the density; take infinitesimal length of $\Delta L$ from the upper horizontal section 1, and take infinitesimal length of $\Delta h$ from the vertical section 2. Take infinitesimal angle of $\Delta\theta$ from the upper arc section 4, and take infinitesimal angle of $\Delta\psi$ from the lower arc section 5. The U-shaped measuring tube swings around Axis OO' with the angular speed of $\omega$;

Calculate the total mass of vibration part of measuring tube.

$$m = m_1 + m_2 + m_3 + m_4$$
$$= \rho \times A \times (L + \pi \times R + 2 \times H + 2 \times R \times \alpha);$$

According to m and J, the height between the inertia center of U-shaped measuring tube and Axis OO' is calculated as:

$$Y = \sqrt{\frac{J}{m}};$$

According to R cos $\alpha$ + Y tan $\alpha$ = 2R + L/2, $\alpha$ can be calculated and obtained.

Further, the height of the vertical section (H) is 78 mm. The radius of the upper arc section and lower arc section (R) is 40 mm. The length of the upper horizontal section (L) is 50 mm. $\alpha$ can be calculated as 40°.

In order to better realize the invention, $Y_{correction} = Y \times K$: In which, $Y_{correction}$ is the height of inertia centre after correction. K is the correction coefficient. It is taken as 1.02~1.05;

According to $$\alpha_{correction} = \frac{\alpha}{Y_{correction}},$$

the correction $\alpha_{correction}$ can be calculated and obtained.

In order to ensure the effect, the height of the vertical section (H) of 78 mm. The radius of the upper arc section and lower arc section (R) is 40 mm. The length of the upper horizontal section (L) is 50 mm. The corrected $\alpha_{correction}$ is calculated as 38°.

Compared to existing technology, the invention has the following advantages and beneficial effects:

By the setting form of the invention, the stress concentration can be relieved and the concentration area changes. At the same time, the composition of the stress is changed. The ratio of shear stress and normal stress in the maximum stress is close to 1, rather than giving priority to a stress form, so as to homogenize the stress of external welding points and internal welding points, and reduce the impact of welding materials and process on the measuring tube. The measurement accuracy of mass flowmeter for CNG gas mass flow can be improved. It is especially suitable for popularization and application in the vibration isolation system of mass flowmeter.

Figure 1:
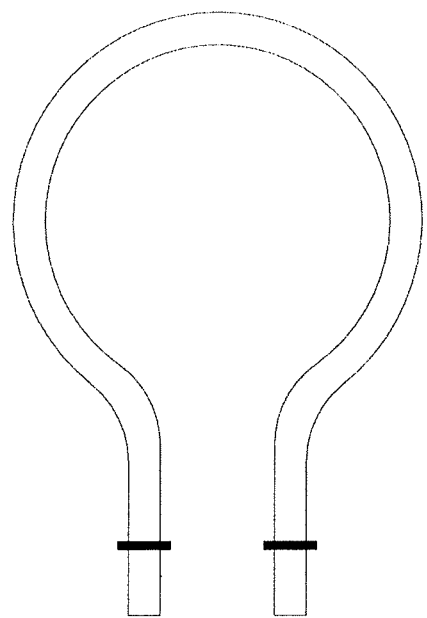
FIG. 1 is the schematic diagram of mass flowmeter with single vibration isolation block in the existing technology.
Figure 2:
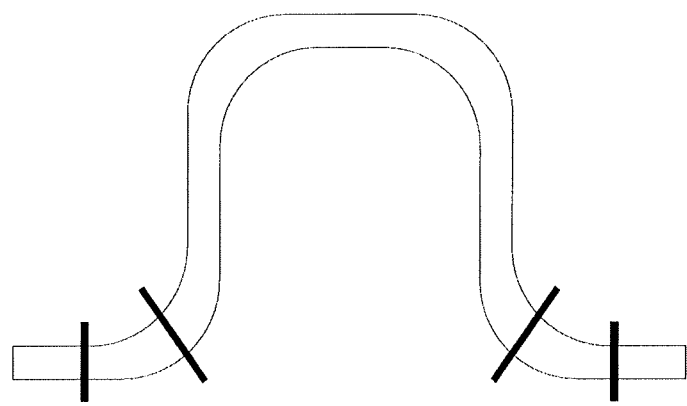
FIG. 2 is the schematic diagram of mass flowmeter with double vibration isolation blocks in the existing technology.
Figure 3:
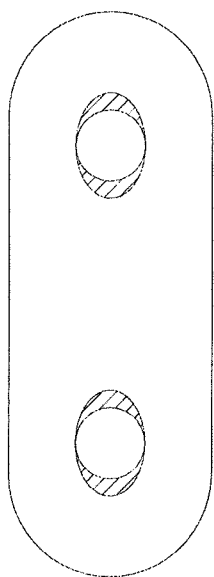
FIG. 3 is the schematic diagram of stress distribution of mass flowmeter with single vibration isolation block in the existing technology.
Figure 4:
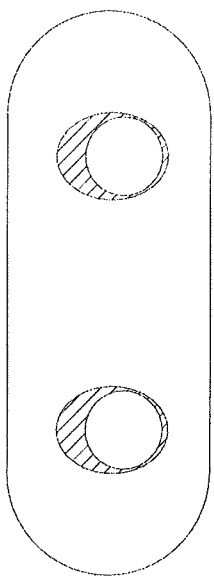
FIG. 4 is the schematic diagram of stress distribution of mass flowmeter with double vibration isolation blocks in the existing technology.

The marks in the figures include horizontal section 1, vertical section 2, lower horizontal section 3, upper arc section 4, lower arc section 5, vibration isolation block 6, axis of U-shaped measuring 7, external welding point A, internal welding point B, to and inertia center C.

DETAILED DESCRIPTION

Combined with the implementation example, this invention is further described in details below:

Implementation Example

Figure 5:
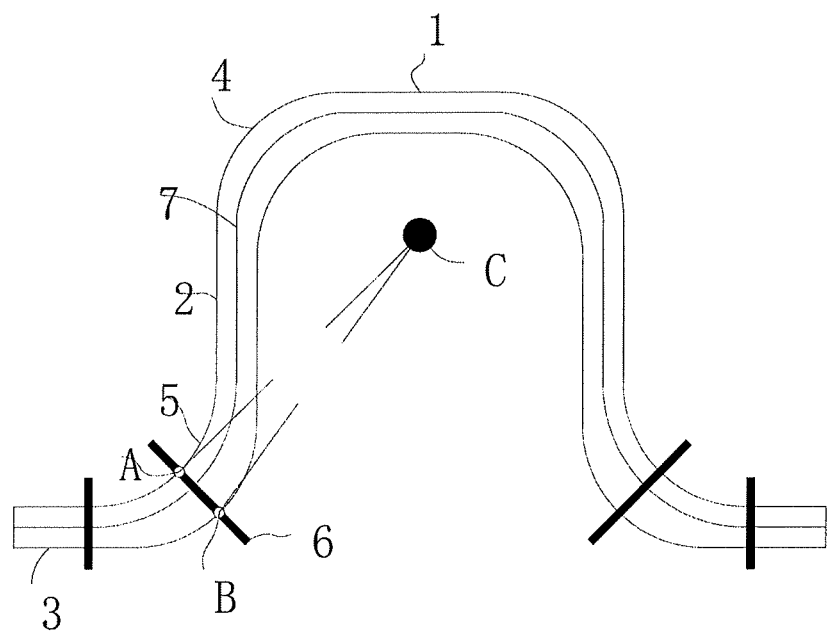
FIG. 5 is the structure diagram of this invention.
Figure 6:
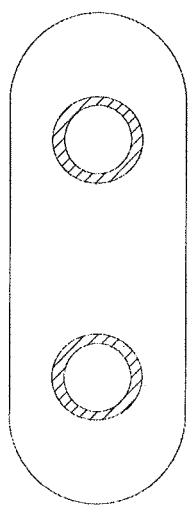
FIG. 6 is the schematic diagram of stress distribution of this invention.

As shown in FIG. 5, the vibration isolation system of mass flowmeter in this invention includes upper horizontal section 1, vertical section 2, lower horizontal section 3, upper arc section between the upper horizontal section 1 and vertical section 2, and lower arc section 5 between the vertical section 2 and lower horizontal section 3 of U-shaped measuring tube. On the lower arc section 5 there is vibration isolation block 6. It is characterized by full-length welding between the vibration isolation block 6's plane of the axis 7 of U-shaped measuring tube and the lower arc section 5. The U-shaped measuring tube has an inertia center C. The straight-line distance between the external welding point A in the full weld of the lower arc section between the vibration isolation block mentioned and the measuring tube and inertia center C is equal to the straight-line distance between the internal welding point B and the inertia center C. By this setting form, the stress concentration can be relieved and the concentration area changes. At the same time, the composition of the stress is changed. The ratio of shear stress and normal stress in the maximum stress is close to 1, rather than giving priority to a stress form, so as to homogenize the stress of external welding point A and internal welding point B (as shown in FIG. 6), and reduce the impact of welding materials and process on the measuring tube. The measurement accuracy of mass flowmeter for CNG gas mass flow can be improved.

Figure 7:
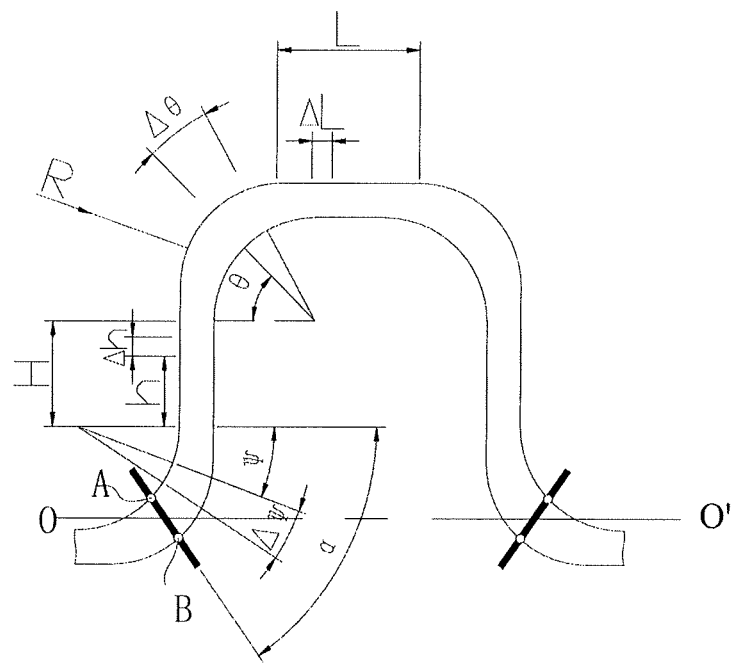
FIG. 7 is the schematic diagram of calculation of this invention.

The size of U-shaped measuring tube is as shown in FIG. 7. Among them, the angle between vibration isolation block and horizontal direction is $\alpha$.

The sectional area of the measuring tube is A and the density is $\rho$.

Take infinitesimal length of $\Delta L$ from the upper horizontal section 1, and take infinitesimal length of $\Delta h$ from the vertical section 2. Take infinitesimal angle of $\Delta \theta$ from the upper arc section 4, and take infinitesimal angle of $\alpha \psi$ from the lower arc to section 5.

Under working state, the U-shaped measuring tube swings slightly around Axis OO' with the angular speed of $\omega$. (passing the middle point between external welding point A and internal welding point B)

At this time, the total inertia moment of U-shaped measuring tube to the vibration isolation block 6 is:

$$J = J1 + J2 + J3 + J4$$

J1—the inertia moment of the upper horizontal section 1 with the top length of L to Axis OO'.

J2—the inertia moment of the upper arc section 4 with the upper radius of R to Axis OO'.

J3—the inertia moment of vertical section 2 with the height of H to Axis OO'

J4—the inertia moment of the arc section with the angle of $\alpha$ in the lower arc section 5 with the radius of R to Axis OO'.

Then $$J_1 = \int_0^L \rho \times A \times \Delta L \times (R + H + R \times \sin\alpha)^2$$
$$= \rho \times A \times L \times (R + H + R \times \sin\alpha)^2$$

In the same way, $$J_2 = \int_0^{\frac{\pi}{2}} 2 \times \rho \times A \times R \times \Delta\theta \times (H + R \times \sin\alpha + R \times \sin\theta)^2$$
$$= 2 \times \rho \times A \times R \times \left( \frac{\pi \times (H + R \times \sin(\alpha))^2}{2} + \right.$$
$$\left. 2 \times R(H + R \times \sin(\alpha)) + R^2 \times \left(\frac{\pi}{4} + 1\right) \right)$$

-continued $$J_3 = \int_0^H 2 \times \rho \times A \times \Delta h \times (h + R \times \sin\alpha)^2$$
$$= 2 \times \rho \times A \times \left( \frac{H^3}{3} + H^2 \times R \times \sin(\alpha) + R^2 \times H \times \sin^2(\alpha) \right)$$

$$J_4 = \int_0^\alpha 2 \times \rho \times A \times R \times \Delta\psi \times (R \times \sin\alpha - R \times \sin\psi)^2$$
$$= 2 \times \rho \times A \times R^2 \times (\alpha \times \sin(\alpha) + \cos(\alpha) - 1)$$

The total mass of the vibration part of the measuring tube is $$m = m_1 + m_2 + m_3 + m_4$$
$$= \rho \times A \times (L + \pi \times R + 2 \times H + 2 \times R \times \alpha)$$

We can obtain the height between the inertia center of U-shaped measuring tube and Axis OO'.

$$Y = \sqrt{\frac{J}{m}};$$

From the geometrical relationship of measuring tube in FIG. 7, we know that:

$$\beta = \arctan\left( \frac{R(2 - \cos\alpha) + L/2}{Y} \right)$$

Figure 8:
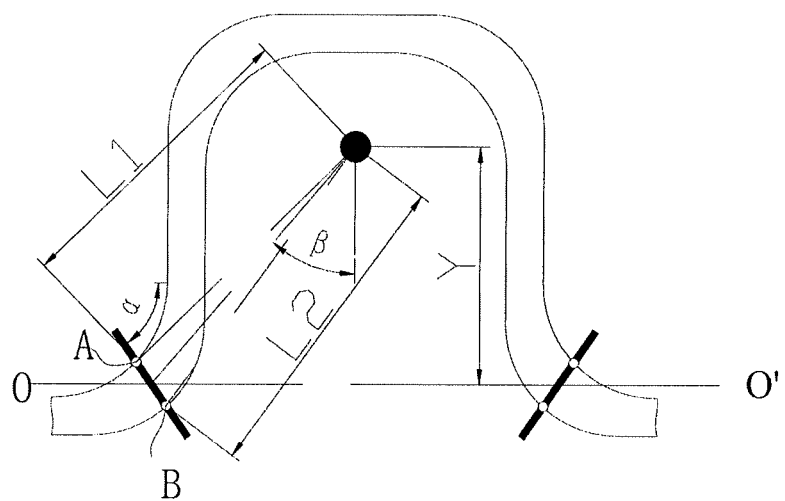
FIG. 8 is the schematic diagram of calculation of this invention.

The size of measuring tube in the implementation example: H=78 mm, R=40 mm and L=50 mm. Assume that =45°, through the matlab calculation, we can obtain:

$Y \approx 90.4$ mm and $\beta \approx 40.3°$. In which $\beta$ is the angle between the line between the inertia center and the middle point of external welding point A and internal is welding point B and the vertical plane. Because $\alpha \neq \beta$ and, the distance between the external welding point A in the full weld of the lower arc section between the vibration isolation block mentioned and the measuring tube and the inertia center is not equal to the straight-line distance between the internal welding point B and the inertia center, which is $L_1 < L_2$. Therefore, the force on external welding point A and internal welding point B is not equal. $F_a > F_b$. So the biggest force on the vibration isolation block is $F_a$. The smallest force is $F_b$. Therefore, the stress is mainly concentrated in Point A (as shown in FIG. 8).

Therefore, in order to achieve the goal of stress homogenization, the condition of $\alpha = \beta$ must be met. From the triangle geometry relationship in FIG. 7, we can obtain when there must be the following results:

$R \cos \alpha + Y \tan \alpha = 2R + L/2$

This equation can be solved through matlab. Under the condition of the current size, we can obtain $\alpha = 40°$. Then $F_a = F_b$. The stress concentration on the vibration isolation block is improved. The stress distribution is uniform.

In addition, considering that driver, speed sensor and other parts shall be installed on the measuring tube, the center of gravity will rise slightly, we can assume that $Y_{correction} = Y \times K$ $Y_{correction}$—the corrected height of inertia center
K—correction coefficient, 1.02~1.05 generally.

We can obtain by calculation According to $$\alpha_{correction} = \frac{\alpha}{Y_{correction}},$$

the angle of vibration isolation block which satisfies the stress equilibrium conditions at this time, is equal to 38°.

Through the use of this invention, design personnel of mass flowmeter can determine the best position of vibration isolation block according to the different sizes of measuring tube.

Above is just for a relatively good implementation example of this invention, but not to limit this invention. Any modification, equivalent replacement and improvements within the spirit and principle of this invention shall be included in the protection scope of this invention.

What is claimed is:

1. The vibration isolation system of mass flowmeter includes upper horizontal section, vertical section, lower horizontal section, upper arc section between the upper horizontal section and vertical section, and lower arc section between the vertical section and lower horizontal section of U-shaped measuring tube, on the lower arc section there is vibration isolation block, it is characterized by full-length welding between the vibration isolation block's plane of the axis of U-shaped measuring tube and the lower arc section, the U-shaped measuring tube has an inertia center, the straight-line distance between the external welding point in the full weld of the lower arc section between the vibration isolation block mentioned and the measuring tube and the inertia center is equal to the straight-line distance between the internal welding point and the inertia center.

2. The mass flowmeter vibration isolation system mentioned in claim 1, wherein $\alpha$, the acute angle between the vibration isolation block mentioned and the horizontal plane, the calculating process of $\alpha$ is as follows:

the total inertia moment of U-shaped measuring tube to the vibration isolation block 6 is:

$J=J1+J2+J3+J4$;

in which, J1 is the inertia moment of the upper horizontal section 1 with the top length of L to Axis OO': J2 is the inertia moment of the upper arc section 4 with the upper radius of R to Axis OO'; J3 is the inertia moment of vertical section 2 with the height of H to Axis OO'; J4 is the inertia moment of the arc section with the angle of $\alpha$ in the lower arc section 5 with the radius of R to Axis OO':

then $$J_1 = \int_0^L \rho \times A \times \Delta L \times (R + H + R \times \sin\alpha)^2;$$

$$J_2 = \int_0^{\frac{\pi}{2}} 2 \times \rho \times A \times R \times \Delta\theta \times (H + R \times \sin\alpha + R \times \sin\theta)^2;$$

$$J_3 = \int_0^H 2 \times \rho \times A \times \Delta h \times (h + R \times \sin\alpha)^2;$$

$$J_4 = \int_0^\alpha 2 \times \rho \times A \times R \times \Delta\psi \times (R \times \sin\alpha - R \times \sin\psi)^2;$$

A is the cross-sectional area of the measuring tube, $\rho$ is the density; take infinitesimal length of $\Delta L$ from the upper horizontal section, and take infinitesimal length of $\Delta h$ from the vertical section 2, take infinitesimal angle of $\Delta\theta$ from the upper arc section, and take infinitesimal angle of $\Delta\psi$ from the lower arc section, the U-shaped measuring tube swings around Axis OO' with the angular speed of $\omega$, calculate the total mass of vibration part of measuring tube, $$m = m_1 + m_2 + m_3 + m_4$$
$$= \rho \times A \times (L + \pi \times R + 2 \times H + 2 \times R \times \alpha);$$

according to m and J, the height between the inertia center of U-shaped measuring tube and Axis OO' is calculated as:

$$Y = \sqrt{\frac{J}{m}};$$

according to $R \cos \alpha + Y \tan \alpha = 2R + L/2$, $\alpha$ can be calculated and obtained.

3. The vibration isolation system of mass flowmeter mentioned in claim 2, wherein the height of the vertical section of 78 mm, the radius of the upper arc section and lower arc section is 40 mm, the length of the upper horizontal section is 50 mm, $\alpha$ can be calculated as 40°.

4. The vibration isolation system of mass flowmeter mentioned in claim 2, wherein:

$Y_{correction} = Y \times K$: In which, $Y_{correction}$ is the height of inertia centre after correction, K is the correction coefficient. It is taken as 1.02~1.05;

according to $$\alpha_{correction} = \frac{\alpha}{Y_{correction}},$$

the corrected $\alpha_{correction}$ can be calculated and obtained.

5. The vibration isolation system of mass flowmeter mentioned in claim 4, wherein the height of the vertical section of 78 mm, the radius of the upper arc section and lower arc section is 40 mm, the length of the upper horizontal section is 50 mm, the corrected $\alpha_{correction}$ is calculated as 38°.

* * * * *